United States Patent
Patterson et al.

(10) Patent No.: US 8,979,161 B2
(45) Date of Patent: Mar. 17, 2015

(54) LOW MASS TRUCK END GATE UTILIZING ALUMINUM STAMPINGS AND EXTRUSIONS

(71) Applicant: GM Global Technology Operations LLC, Detroit, MI (US)

(72) Inventors: Derek L. Patterson, Shelby Township, MI (US); Paulo M. Mendonca, Sao Caetano Do Sul (BR); Paul E. Krajewski, Troy, MI (US); Joseph E. Champa, Shelby Township, MI (US); Robert A. Greene, Roseville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/836,632

(22) Filed: Mar. 15, 2013

(65) Prior Publication Data
US 2014/0265414 A1 Sep. 18, 2014

(51) Int. Cl.
*B60P 1/267* (2006.01)
*B60J 5/10* (2006.01)

(52) U.S. Cl.
CPC ........................................ *B60J 5/107* (2013.01)
USPC ........................................................ 296/50

(58) Field of Classification Search
CPC ... A23G 3/346; A23G 2200/00; A23G 11/06; C07C 275/50; C08L 2666/02; G11C 11/42; G11C 8/16; H01L 27/105; H01L 27/11; H01L 27/1104
USPC .......................................................... 296/50
See application file for complete search history.

(56) References Cited

U.S. PATENT DOCUMENTS

| | | | | |
|---|---|---|---|---|
| 3,557,672 A * | 1/1971 | Shurtz et al. | 404/95 |
| 3,612,602 A * | 10/1971 | Stepp | 296/56 |
| 3,814,479 A * | 6/1974 | Vornberger | 298/23 M |
| 4,067,470 A * | 1/1978 | Felburn | 414/469 |
| 4,098,414 A * | 7/1978 | Abiera | 414/537 |
| 4,743,062 A * | 5/1988 | McLaren et al. | 296/146.5 |
| 4,822,098 A * | 4/1989 | Vogt et al. | 296/146.5 |
| 4,923,074 A * | 5/1990 | Johnston | 220/1.5 |
| 4,932,705 A * | 6/1990 | Miller | 296/50 |
| D312,599 S * | 12/1990 | Johnston | D12/15 |
| 5,255,953 A * | 10/1993 | Frank | 296/146.6 |
| 5,464,266 A * | 11/1995 | Guertler | 296/187.12 |
| 5,466,032 A * | 11/1995 | Clausen et al. | 296/187.12 |
| 5,727,826 A * | 3/1998 | Frank et al. | 293/102 |
| 5,791,726 A * | 8/1998 | Kaufman | 296/182.1 |
| 5,795,011 A * | 8/1998 | Flentge | 296/100.01 |
| 5,876,086 A * | 3/1999 | Lagrou et al. | 296/146.11 |
| 5,944,373 A * | 8/1999 | Seksaria et al. | 296/57.1 |
| 5,947,540 A * | 9/1999 | Pariseau et al. | 296/57.1 |
| 5,992,922 A * | 11/1999 | Harbig et al. | 296/146.6 |
| 6,068,327 A * | 5/2000 | Junginger | 296/146.13 |
| 6,102,470 A * | 8/2000 | Heim et al. | 296/187.11 |
| 6,193,295 B1 * | 2/2001 | Stragier | 296/56 |
| 6,224,138 B1 * | 5/2001 | Adsit et al. | 296/100.05 |
| 6,302,472 B1 * | 10/2001 | Rahmstorf et al. | 296/146.5 |
| 6,431,638 B1 * | 8/2002 | Mrozowski et al. | 296/146.8 |
| 6,435,604 B2 * | 8/2002 | Gaeta | 296/202 |
| 6,471,279 B2 * | 10/2002 | Pommeret | 296/57.1 |
| 6,471,284 B2 * | 10/2002 | Landmesser | 296/146.8 |
| 6,513,852 B1 * | 2/2003 | Krist et al. | 296/50 |
| 6,672,642 B1 * | 1/2004 | Seksaria et al. | 296/50 |

(Continued)

*Primary Examiner* — Kiran B Patel
(74) *Attorney, Agent, or Firm* — BrooksGroup

(57) ABSTRACT

A number of variations may include a product including an extruded support beam constructed and arranged to be used as an inner support for a vehicle end gate.

16 Claims, 4 Drawing Sheets

(56) References Cited

U.S. PATENT DOCUMENTS

| | | | |
|---|---|---|---|
| 6,672,654 B2 * | 1/2004 | Yamada et al. | 296/205 |
| 6,776,449 B2 * | 8/2004 | Komatsu et al. | 296/146.5 |
| 6,805,398 B2 * | 10/2004 | Harima et al. | 296/146.7 |
| 6,824,198 B2 * | 11/2004 | Sakuma et al. | 296/146.6 |
| 6,929,308 B2 * | 8/2005 | Komatsu et al. | 296/146.5 |
| 6,951,357 B2 * | 10/2005 | Armstrong et al. | 296/57.1 |
| 6,983,972 B2 * | 1/2006 | Tan et al. | 296/57.1 |
| 7,021,698 B2 * | 4/2006 | Yamada et al. | 296/146.8 |
| 7,070,222 B2 * | 7/2006 | Bruford et al. | 296/57.1 |
| 7,077,438 B2 * | 7/2006 | Albers et al. | 293/102 |
| 7,097,742 B2 * | 8/2006 | Furuse | 296/146.6 |
| 7,118,153 B2 * | 10/2006 | Kitayama et al. | 296/57.1 |
| 7,144,072 B2 * | 12/2006 | Wallstrom et al. | 296/187.03 |
| 7,213,859 B1 * | 5/2007 | Tan et al. | 296/57.1 |
| 7,363,750 B2 * | 4/2008 | Seksaria et al. | 49/502 |
| 7,407,213 B2 * | 8/2008 | Eschebach et al. | 296/57.1 |
| 7,472,938 B2 * | 1/2009 | Firzlaff et al. | 296/57.1 |
| 7,503,620 B2 * | 3/2009 | Brennecke et al. | 296/187.02 |
| 7,607,716 B2 * | 10/2009 | Buchta et al. | 296/146.6 |
| 7,841,821 B2 * | 11/2010 | Miro et al. | 414/462 |
| 7,971,919 B2 * | 7/2011 | Vertanen | 296/39.2 |
| 8,042,861 B2 * | 10/2011 | Molnar et al. | 296/154 |
| 8,136,862 B2 * | 3/2012 | Bator et al. | 296/57.1 |
| 8,177,285 B2 * | 5/2012 | Ishitobi et al. | 296/146.6 |
| 8,419,091 B2 * | 4/2013 | Roll et al. | 293/120 |
| 8,550,536 B2 * | 10/2013 | Gachter et al. | 296/146.8 |
| 8,567,841 B2 * | 10/2013 | Ginestet et al. | 296/56 |
| 2004/0164580 A1 * | 8/2004 | Armstrong et al. | 296/50 |
| 2005/0046229 A1 * | 3/2005 | Yamada et al. | 296/146.8 |
| 2005/0110293 A1 * | 5/2005 | Tan et al. | 296/26.09 |
| 2005/0117270 A1 * | 6/2005 | Scherraus | 361/302 |
| 2005/0150166 A1 * | 7/2005 | Seksaria et al. | 49/352 |
| 2006/0082180 A1 * | 4/2006 | Bruford et al. | 296/50 |
| 2007/0102587 A1 * | 5/2007 | Jones et al. | 244/214 |
| 2007/0210613 A1 * | 9/2007 | Tanaka et al. | 296/146.6 |
| 2007/0236038 A1 * | 10/2007 | Firzlaff et al. | 296/57.1 |
| 2007/0277926 A1 * | 12/2007 | Naughton et al. | 156/243 |
| 2007/0278819 A1 * | 12/2007 | Seksaria et al. | 296/146.6 |
| 2008/0001430 A1 * | 1/2008 | Booher | 296/184.1 |
| 2008/0164709 A1 * | 7/2008 | Bernhardsson et al. | 296/37.14 |
| 2008/0169682 A1 * | 7/2008 | Hedderly | 296/193.08 |
| 2009/0289467 A1 * | 11/2009 | Molnar et al. | 296/57.1 |
| 2010/0084888 A1 * | 4/2010 | Ishitobi et al. | 296/146.6 |
| 2010/0289289 A1 * | 11/2010 | Bator et al. | 296/55 |
| 2013/0057018 A1 * | 3/2013 | Reese | 296/146.6 |
| 2013/0122246 A1 * | 5/2013 | Berger et al. | 428/119 |
| 2013/0292238 A1 * | 11/2013 | Petty et al. | 200/505 |

* cited by examiner

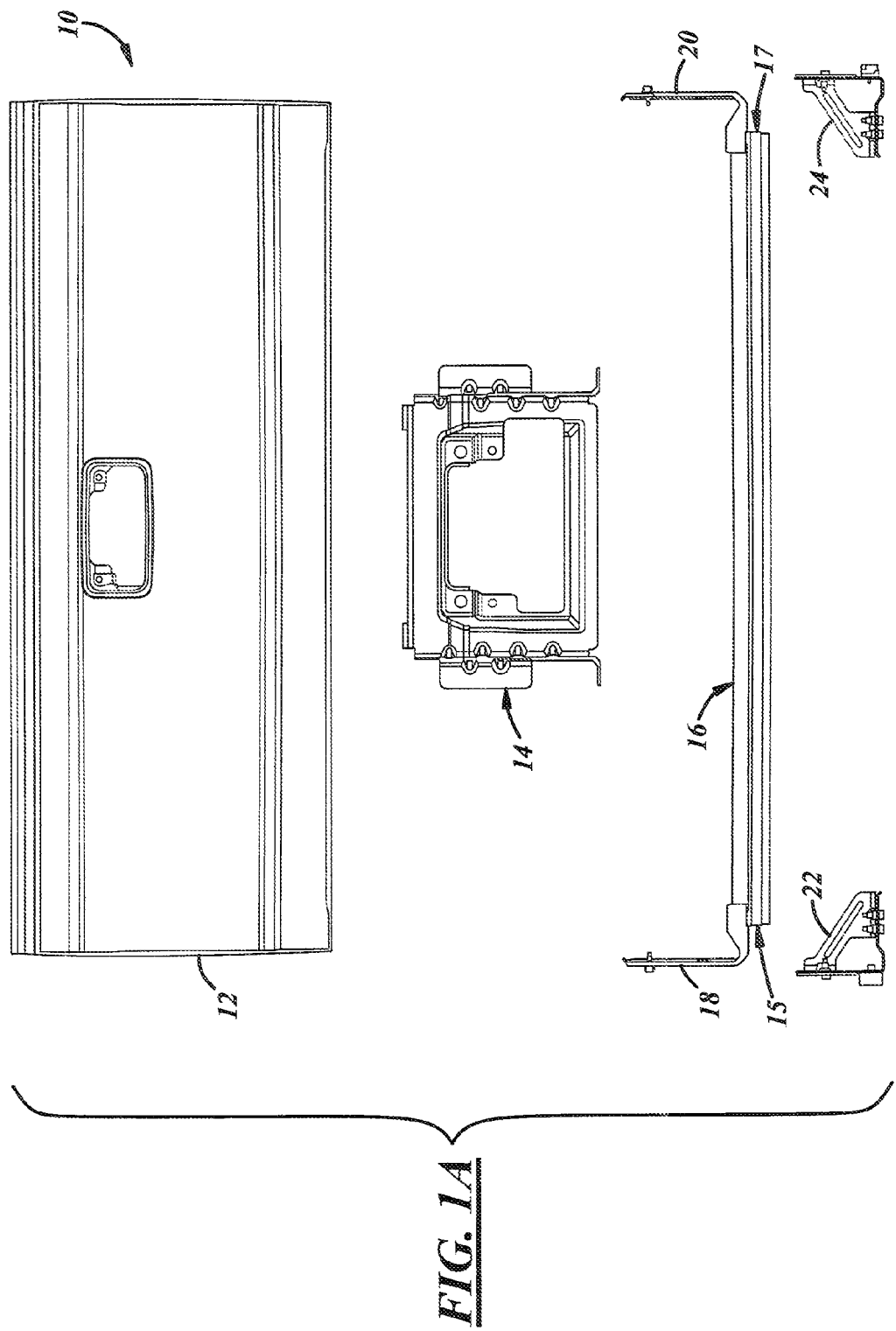

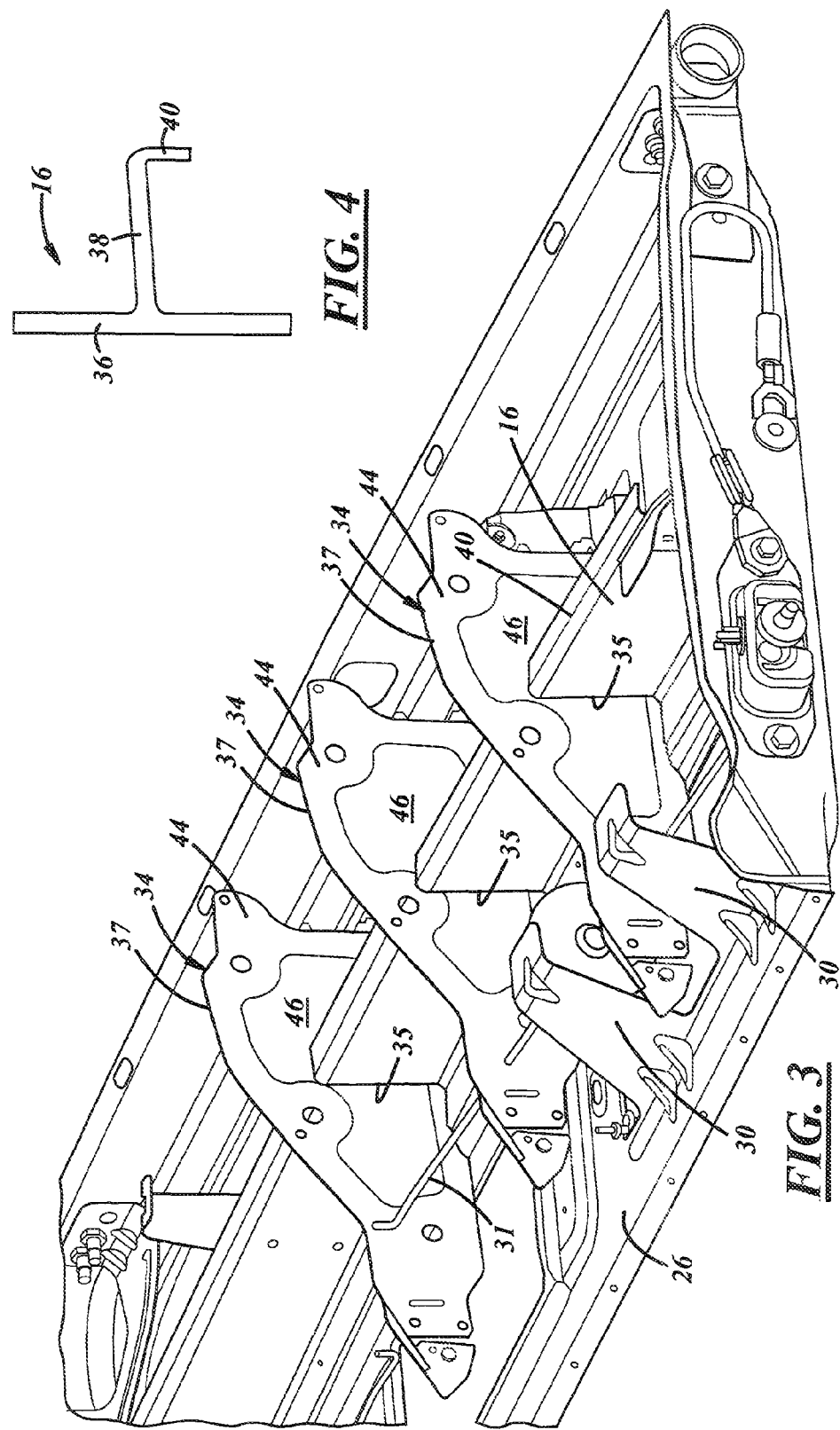

US 8,979,161 B2

LOW MASS TRUCK END GATE UTILIZING ALUMINUM STAMPINGS AND EXTRUSIONS

TECHNICAL FIELD

The field to which the disclosure generally relates to includes truck end gates and methods of making the same.

BACKGROUND

Vehicles such as trucks are often equipped with an end gate.

SUMMARY OF ILLUSTRATIVE VARIATIONS OF THE INVENTION

A product comprising: an extruded beam comprising aluminum constructed and arranged for use as an inner support in a vehicle end gate.

BRIEF DESCRIPTION OF THE DRAWINGS

Select examples of variations of the invention will become more fully understood from the detailed description and the accompanying drawings, wherein:

FIG. 1A illustrates components of a product, which may include an extruded beam constructed and arranged for use as an inner support for a vehicle end gate according to a number of variations of the invention.

FIG. 3 illustrates portions of a vehicle end gate including a plurality of wing spars connected to an extruded beam comprising aluminum according to a number of variations of the invention.

FIG. 4 is a sectional view of an extruded support beam for an end gate according to a number of variations of the invention.

DETAILED DESCRIPTION OF ILLUSTRATIVE VARIATIONS OF THE INVENTION

Figure 1B:
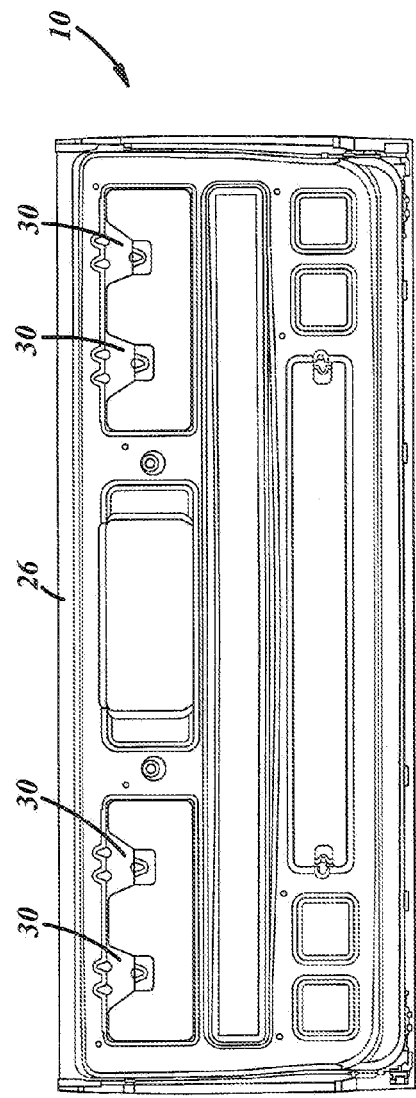
FIG. 1B illustrates a product including a vehicle end gate having an end gate inner panel made from a stamped substrate comprising aluminum according to a number of variations of the invention.

The following description of the variations is merely illustrative in nature and is in no way intended to limit the invention, its application, or uses.

A number of variations of the invention are illustrated in FIG. 1A and may include one or more components such as, but not limited to, a stamped cuter body panel 12 of a vehicle end gate. The stamped outer body panel may include any of a number of materials such as, but not limited to, A plastic, cold rolled steel, hot rolled steel, stainless steel, or an aluminum alloy. A product 10 according to a number of variations of the invention may include a handle reinforcement bracket 14. In a number of variations, the product 10 may include an extruded support beam 16 constructed and arranged for use as an inner component of a vehicle end gate. A first latch reinforcement 18 may be connected to the extruded support beam 16 near a free end 15 thereof, and a second latch reinforcement 20 may be connected to a second free end 17 of the extruded support beam 16. The product 10 may also include a first reinforcement bracket 22 and a second reinforcement bracket 24.

Figure 1C:
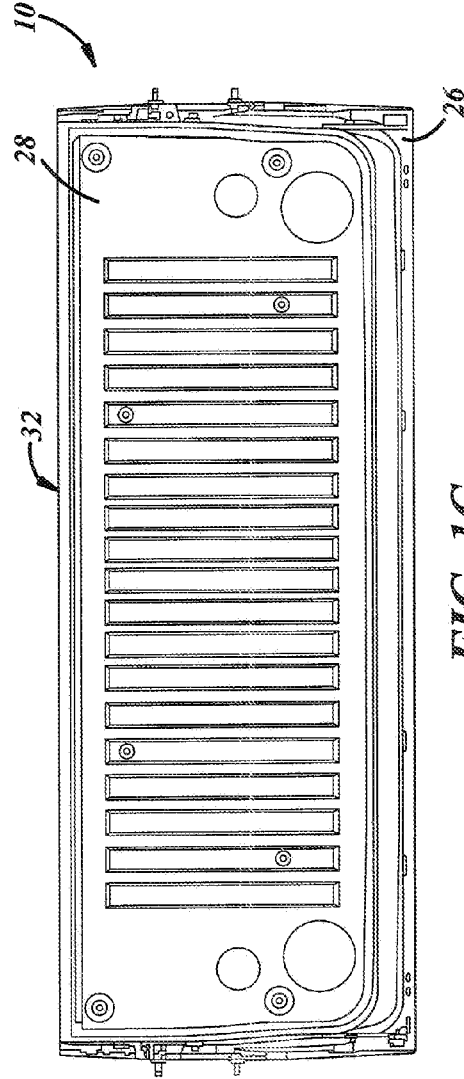
FIG. 1C illustrates a product including a polymeric or composite cover over the end gate inner panel shown in FIG. 1B according to a number of variations of the invention.

The product 10 may include an end gate inner panel 26 which may be stamped from any of a variety of suitable materials, including a material comprising aluminum, as illustrated in FIG. 1B. In other variations the end gate panel 26 may include a molded composite including a thermoplastic material, which may be reinforce with glass, carbon, or polymeric fibers. In a number of variations the end gate inner panel 26 may have a thickness less than 1.5 mm, less than or equal to 1.2 mm. FIG. 1C illustrates a variation wherein the product 10 may also include a polymeric or composite cover 28 overlying the components illustrated in FIGS. 1A-1B to provide an end gate 32. In a number of variations of the invention the cover 28 may include at least one of thermoplastic or thermoset polymers, which may be reinforced with glass, carbon or polymeric fibers. In a number of variations, the end gate inner panel 26 and the cover 28 may be a continuous un-joined single piece of.

Figure 2:
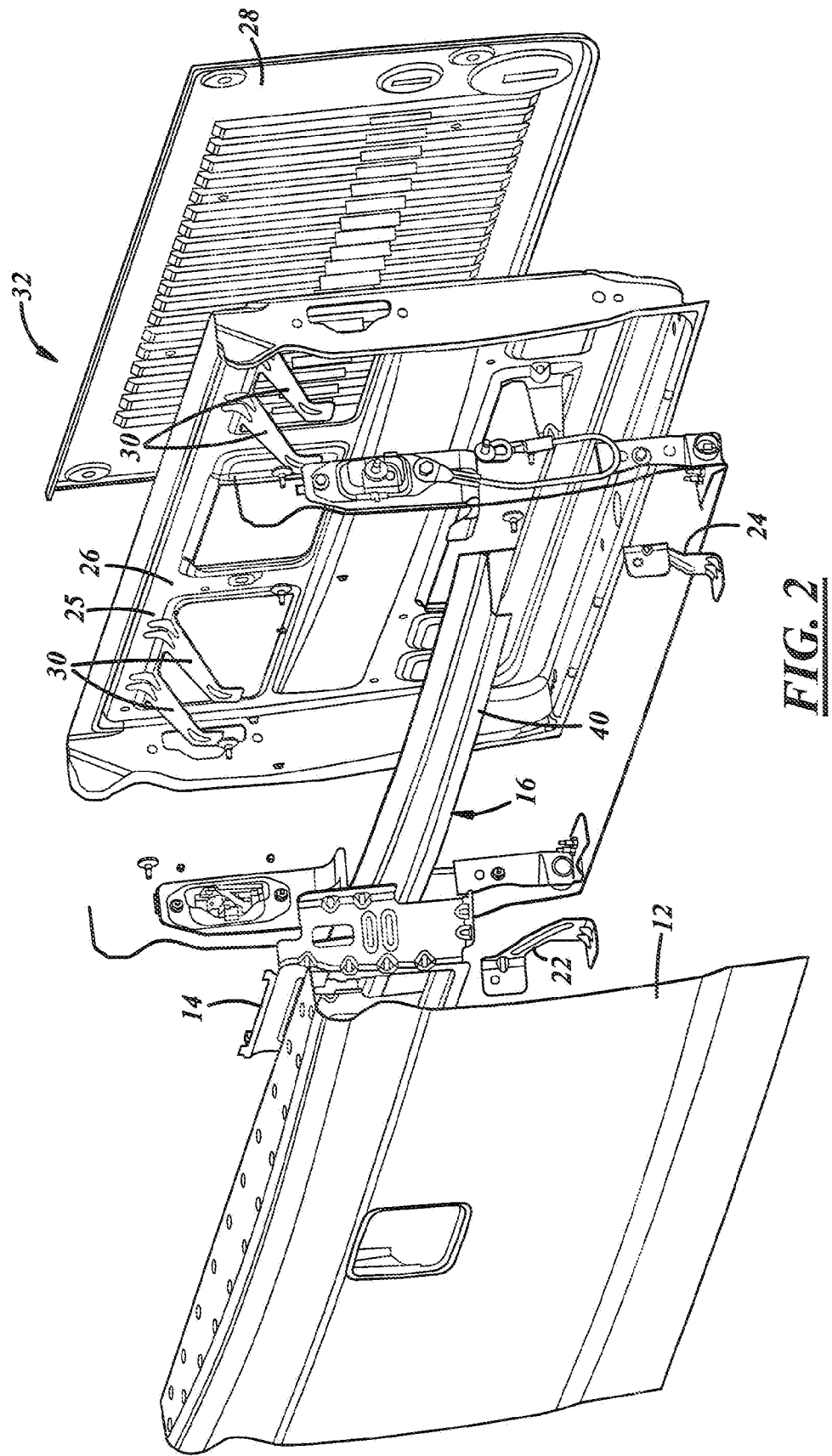
FIG. 2 is an exploded view of a product including a vehicle end gate having an extruded beam comprising aluminum constructed and arranged as an inner support of the end gate according to a number of variations of the invention.

FIG. 2 illustrates a number of variations of the invention, which may include a stamped end gate inner panel 26 having a plurality of support tabs 30 extending outward from a body portion 25 and constructed and arranged to engage and/or support the stamped outer body panel 12. A tail portion 40 of the extruded support beam 16 may be constructed and arranged to engage or otherwise support the stamped outer body panel 12.

FIG. 3 illustrates a number of variations of the invention, which may include a plurality of wing spars 34, which may include a slot 35 defined therein for receiving the extruded support beam 16. In this variation, the tail portion 40 of the extruded support beam 16 engages the wing spar 34 instead of the stamped outer body panel 12. The wing spar 34 may have an outer profile edge 37 which generally matches the inner profile of the stamped outer body panel 12 and may be constructed and arranged so that at least a portion of the outer profile edge 37 engages the stamped outer body panel 12. The wing spar 34 may include a rigid plastic or thermoset portion 44 and an expandable form core portion 46.

FIG. 4 is a sectional view of the extruded support beam 16 which may include a bar portion 36 and a leg portion 38 extending form the bar portion 36. In a number of variations the leg portion 38 may be slanted with respect to the bar portion 36, for example, extending from the bar portion 36 at an angle less than 90°. A tail portion 40 may extend from the leg portion 38. In a number of variations the tail portion may extend in a direction generally parallel to the bar portion 36. In a number of variations the bar portion 36, leg portion 38, and optionally the tail portion 40 may be one continuous un-joined single piece. In a number of variations the extruded support beam 16 may have a thickness measured along the bar portion 36, leg portion or tail portion greater than 2.0 mm, equal to or greater than 2.2 mm. In a number of variations of the invention the extruded support beam 36 may include an aluminum alloy.

A truck end gate 32 including an extruded support beam portion 16 comprising aluminum and at least a stamped end gate inner panel 26 comprising aluminum was utilized to make an end gate 32 having a composite cover 28. The truck end gate 32 may have a first longitudinal edge 42 and an opposite second longitudinal edge 48, a first side edge 46 and an opposite second side edge 48. A truck end gate 32 constructed and arranged according to a number of variations of the invention described herein was subjected to a longitudinal strength test wherein a force was applied to the end gate 32 along the area illustrated by bar 41 extending between the first longitudinal side edge 42 and the second opposite longitudinal side edge 48 at a location generally midway between the first side edge 46 and the second side edge 48. A truck end gate 32 including an extruded support beam 16 as described herein was able to withstand a comparable force to that of a steel truck end gate during various testing.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: an extruded support beam comprising aluminum constructed and arranged to be used as an inner support in a vehicle end gate.

Variation 2 may include a product as set forth in Variation 1 wherein the extruded support beam includes a bar portion and a leg extending down from the bar portion, and wherein the bar portion and leg portion are one continuous un-joined single piece.

Variation 3 may include a product as set forth in Variation 2 wherein the extruded support beam further comprises a tail portion extending from the leg portion.

Variation 4 may include a product as set forth in any of Variations 2-3 wherein the leg portion extends from the bar portion at an angle less than 90°.

Variation 5 may include a product as set forth in any of Variations 2-4 wherein the tail portion extends from the leg portion in a direction generally parallel to the bar portion.

Variation 6 may include a product as set forth in any of Variations 1-6 further comprising a stamped inner panel comprising aluminum connected to the extruded support beam comprising aluminum.

Variation 7 may include a product as set forth in any of Variations 1-6 further comprising a stamped outer body panel connected to the extruded support beam.

Variation 8 may include a product as set forth in any of Variations 1-7 wherein the stamped outer body panel comprises aluminum.

Variation 9 may include a product as set forth in any of Variations 1-8 further comprising a cover overlying the end gate inner panel.

Variation 10 may include a product as set forth in any of Variations 1-9 wherein the cover comprises a polymer.

Variation 11 may include a product as set forth in any of Variations 1-10 wherein the cover further comprises reinforcing fibers.

Variation 12 may include a product as set forth in any of Variations 1-11 further comprising a plurality of wing spars, each spar including a slot formed therein, and wherein the extruded support beam is received in the slot formed in each wing spar.

Variation 13 may include a product as set forth in any of Variations 1-12 wherein each of the plurality of wing spars comprises a plastic or thermoset portion, and an expandable foam core portion.

Variation 14 may include a product as set forth in any of Variations 1-13 further comprising a stamped outer body panel connected to the extruded support beam, and wherein each of the plurality of wing spars includes an outer profile edge, at least a portion of the outer profile edge being constructed and arranged to engage the stamped outer body panel.

Variation 15 may include a product comprising: a truck end gate comprising an extruded support beam comprising aluminum, an end gate inner panel comprising aluminum connected to the extruded support beam, and a cover overlying the end gate inner panel, the cover comprising a polymer.

Variation 16 may include a product as set forth in claim 15 further comprising a stamped outer body panel, and wherein the extruded support beam, end gate inner panel, cover and stamped outer body panel are constructed and arranged so that the end gate withstands loads comparable to a steel end gate.

Variation 17 may include a method comprising: extruding a support beam comprising aluminum constructed and arranged to be used as an inner support in a vehicle end gate; attaching a stamped inner panel comprising aluminum to the extruded support beam comprising aluminum; attaching a stamped outer body panel connected to the extruded support beam; and attaching an inner date cover to the end gate inner panel.

Variation 18 may include a method as set forth in Variation 17 wherein the cover comprises a polymer.

Variation 19 may include a method as set forth in claim 18 wherein the cover further comprise reinforcing fibers.

Variation 20 may include a method as set forth in any of Variations 17-19 wherein the extruded support beam includes a bar portion and a leg extending down from the bar portion, and wherein the bar portion and leg portion are one continuous un-joined single piece.

The above description of select examples of the invention is merely exemplary in nature and, thus, variations or variants thereof are not to be regarded as a departure from the spirit and scope of the invention.

What is claimed is:

1. A product comprising:
    an extruded support beam comprising aluminum constructed and arranged to be used as an inner support in a vehicle end gate, wherein the extruded support beam includes a bar portion and a leg extending down from the bar portion, and wherein the leg portion extends from the bar portion at an angle less than 90°.

2. A product as set forth in claim 1 wherein the bar portion and leg portion are one continuous un-joined single piece.

3. A product as set forth in claim 2 wherein the extruded support beam further comprises a tail portion extending from the leg portion.

4. A product as set forth in claim 3 wherein the tail portion extends from the leg portion in a direction generally parallel to the bar portion.

5. A product as set forth in claim 1 further comprising a stamped inner panel comprising aluminum connected to the extruded support beam comprising aluminum.

6. A product as set forth in claim 5 further comprising a stamped outer body panel connected to the extruded support beam.

7. A product as set forth in claim 6 wherein the stamped outer body panel comprises aluminum.

8. A product as set forth in claim 5 further comprising a cover overlying the end gate inner panel.

9. A product as set forth in claim 8 wherein the cover comprises a polymer.

10. A product as set forth in claim 9 wherein the cover further comprises reinforcing fibers.

11. A product as set forth in claim 1 further comprising a plurality of wing spars, each spar including a slot formed therein, and wherein the extruded support beam is received in the slot formed in each wing spar.

12. A product as set forth in claim 11 wherein each of the plurality of wing spars comprises a plastic or thermoset portion, and an expandable foam core portion.

13. A product as set forth in claim 11 further comprising a stamped outer body panel connected to the extruded support beam, and wherein each of the plurality of wing spars includes an outer profile edge, at least a portion of the outer profile edge being constructed and arranged to engage the stamped outer body panel.

14. A product comprising:
   an extruded support beam comprising aluminum constructed and arranged to be used as an inner support in a vehicle end gate, wherein the extruded support beam includes a plurality of wing spars, wherein each of the plurality of wing spars include a slot formed therein, and wherein the extruded support beam is received in the slot formed in each of the plurality of wing spars.

15. A product as set forth in claim 14 wherein each of the plurality of wing spars comprises a plastic or thermoset portion, and an expandable foam core portion.

16. A product as set forth in claim 14 further comprising a stamped outer body panel connected to the extruded support beam, and wherein each of the plurality of wing spars includes an outer profile edge, at least a portion of the outer profile edge being constructed and arranged to engage the stamped outer body panel.

\* \* \* \* \*